23

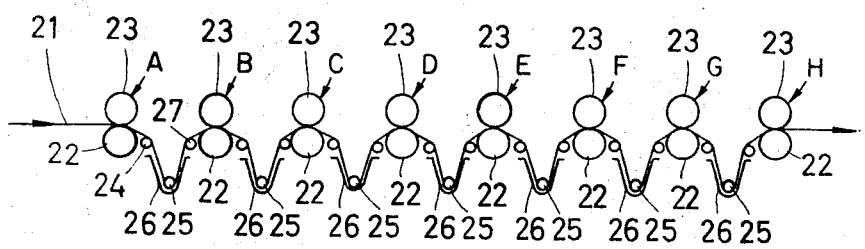
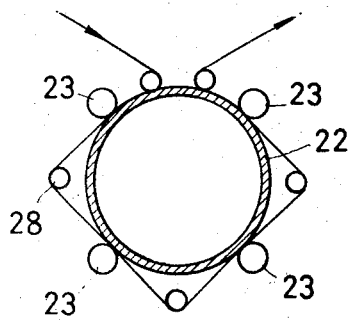
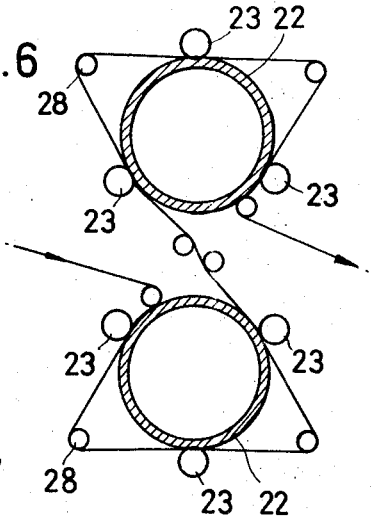
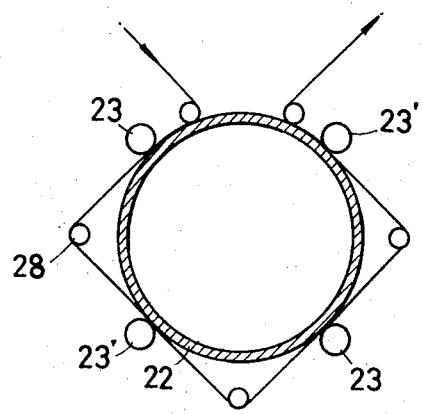

23'

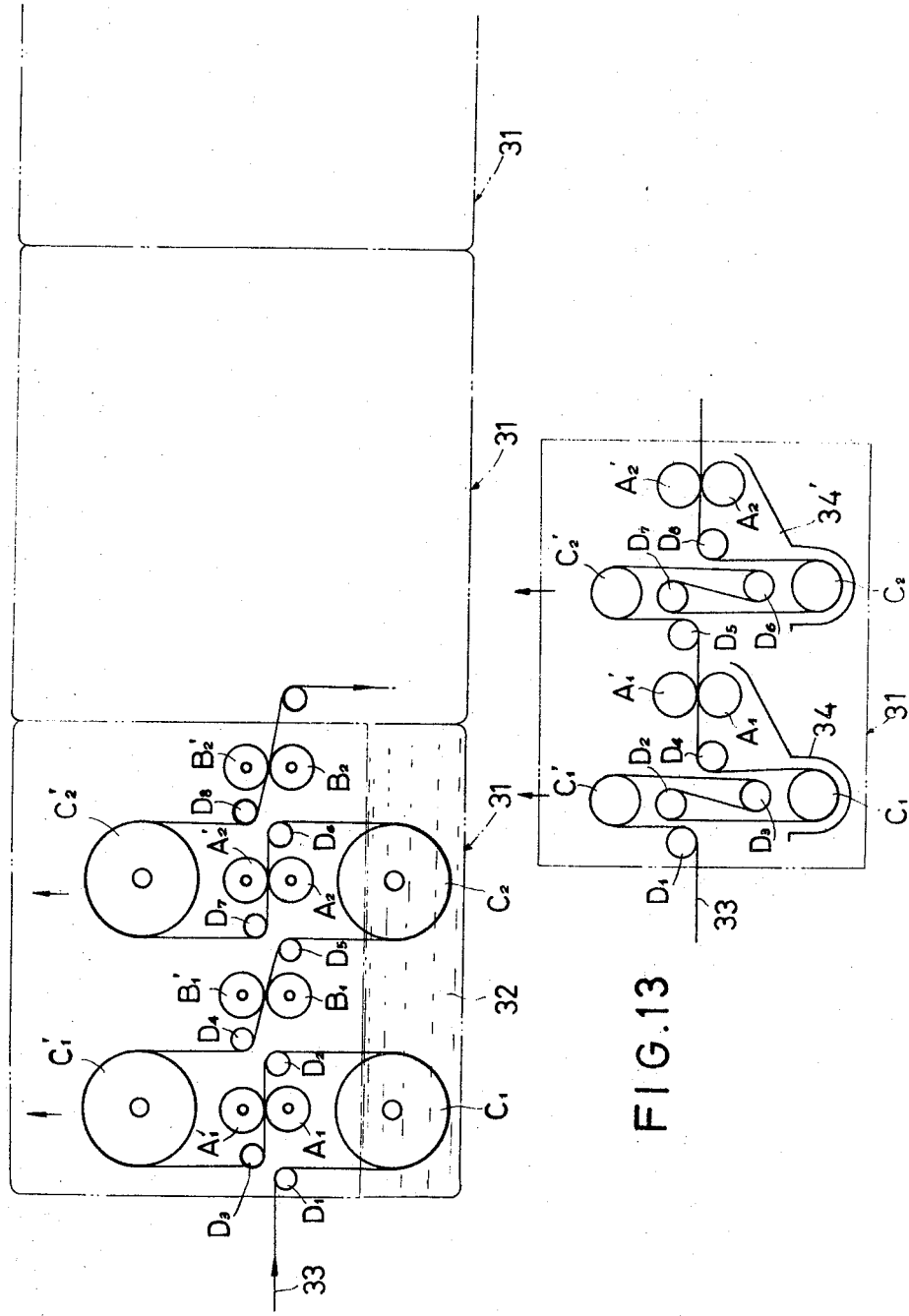

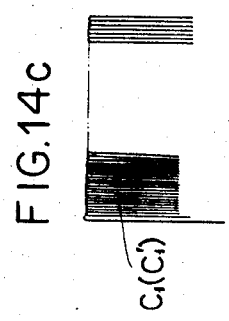
FIG.14c
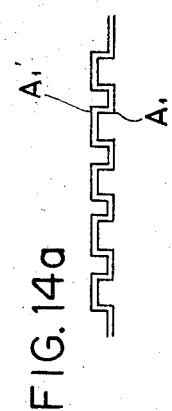
FIG.14a
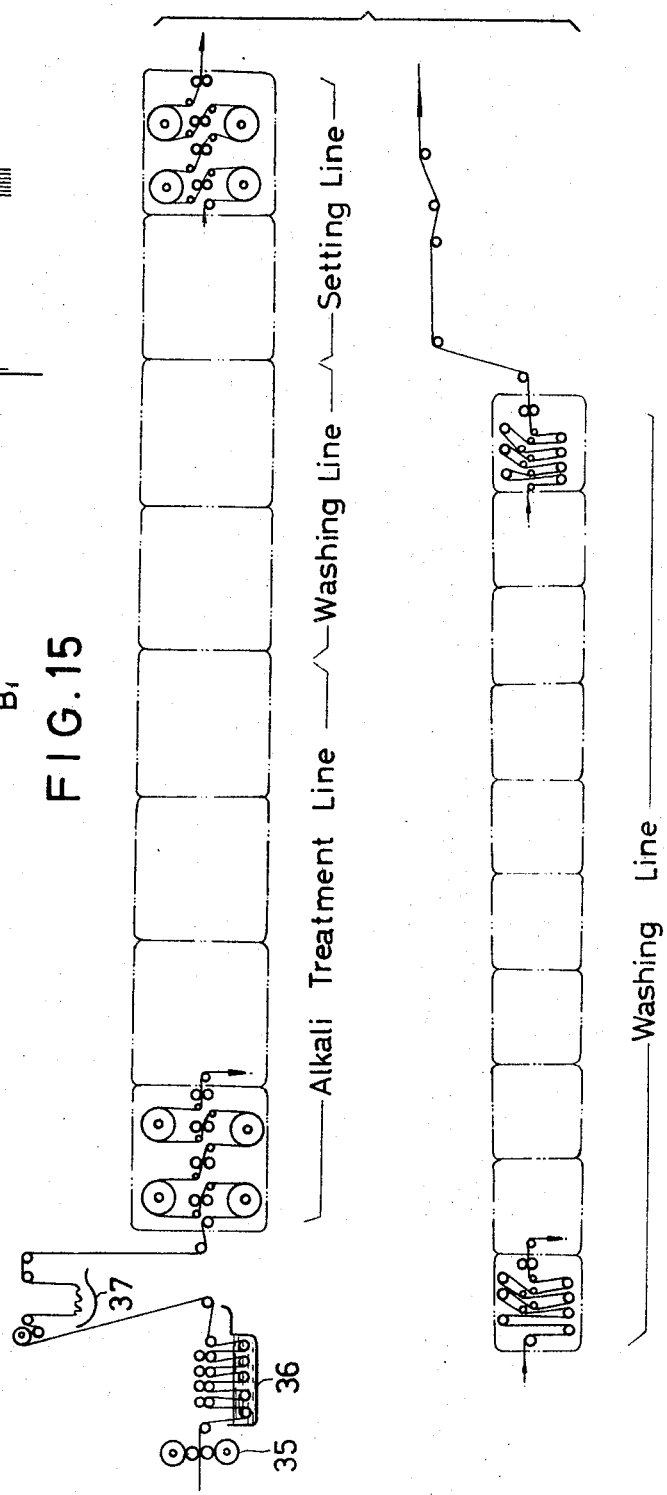
FIG.14b
FIG.15
INVENTORS
YOSHIKAZU SANDO
HIROSHI ISHIDOSHIRO
BY
ATTORNEYS 3,545,054
METHOD OF LONGITUDINALLY AND LATERALLY TENSIONING CLOTH
Yoshikazu Sando 215 Usu, and Hiroshi Ishidoshiro, 486 Wakanoura, both of Wakayama-shi, Wakayama-ken, Japan
Filed May 16, 1967, Ser. No. 638,971
Claims priority, application Japan, May 23, 1966, 41/32,872; Nov. 24, 1966, 41/77,123; Feb. 15, 1967, 42/9,732
Int. Cl. D06c 3/06
U.S. Cl. 26—51
2 Claims

ABSTRACT OF THE DISCLOSURE

A method of processing and treating cloth comprising continuously passing cloth along a path of travel, gripping the opposite faces of the cloth and laterally tensioning the cloth as it passes along its path of travel, longitudinally tensioning the cloth, and immersing the cloth in a solution bath, whereby the cloth is tensioned in both the lateral and longitudinal direction during the same processing operation.

---

The present invention relates to a method of processing and treating cloth. More particularly, it relates to various methods of processing and treating cloth, such as a squeezing treatment during a washing operation comprising passing cloth between a pair of endless rollers having grooves in their surfaces in contact with each other.

Further, the present invention relates to a method of treating cloth by employing a combination of grooved rollers and flat or smooth rollers for the main purpose of increasing the strength of the cloth.

In the conventional squeezing treatment in a washing operation, the circumference of each squeezing roller used is smooth, and the object of the treatment is to squeeze out a cloth transported from a washing tank and to increase the degree of water absorption of the cloth in the next washing tank. However, in this case, the higher the transportation speed of the cloth, the greater will be the number of washing tanks and squeezing rollers required, and in addition a larger quantity of water will be required.

In order to improve the above-mentioned washing effect, various methods have hitherto been adopted, for example, washing the cloth by vibration, washing by employing water-jets and the like, but these methods have limited effectiveness, and their defects could not be compensated by employing a squeezing roller, except for the purpose of squeezing the cloth.

The present invention avoids the aforementioned defects of the conventional methods. It is contemplated that a pair of rollers having grooved surfaces in engagement with each other are employed in order to make it possible to wash by rubbing (washing with water) as well as squeezing, to avoid width shrinkage of the cloth or, if required, to widen the cloth and determine the width thereof.

A pair of rollers, as used in the present invention, is provided with a number of grooves on the peripheral surfaces of the rollers in the radial direction. These grooves may be arranged in a plane slanted to the radial direction of the rollers or they may be in a series of helical type grooves. The rollers may be endlessly engaged with each other, that is to say, the grooves of one of the rollers may be engaged with projections on the surface of the other roller to make continuous contact during rotation.

Thus, according to the present invention, when the cloth is transported between and in contact with these rollers, it is subjected to a wash by rubbing in the longiudinal direaction owing to a peripheral velocity difference between the projected surfaces and the grooved surfaces of the rollers, and it is subjected to a wash by rubbing in the lateral direction owing to the expansion and contraction of the width of the cloth as it is pushed into the grooves and projections. Thus, according to the present invention, a wash by rubbing and squeezing can be done at the same time, which could not be done in the methods employing conventional squeezing rollers, and the washing effect can be improved considerably.

Further, according to the present invention, the cloth is forced into engagement with two rollers, and this provides certain advantages such as the prevention of width shrinkage of the cloth, prevention of wrinkling, and it is also effective in case the cloth is treated with various kinds of agents such as alkali, acid and the like.

Further, when the grooves of the above-mentioned pair of rollers endlessly engaged with each other are helically formed left and right and extend progressively from the middle of the roller's surface towards the edge of the cloth, the effects such as the prevention of shrinkage as well as the width expansion of the cloth may be obtained.

According to the method of the present invention, various applications thereof besides the afore-mentioned washing by rubbing may be conceived.

For example, the cloth is enlarged to a certain width by an appropriate combination of the above-mentioned grooved rollers to prevent and regulate any shrinkage of the width of cloth, and therefore it is possible to carry out a chainless mercerizing treatment.

Apparatus for a chainless mercerizing treatment utilizing rollers has hitherto been available, but though such apparatus can impose a sufficient tension on the cloth in a longitudinal direction, it is impossible to prevent shrinkage in the width of the cloth by imposing a lateral tension thereon, because the rollers have smooth peripheral surfaces. Accordingly, uniformly of whiteness and lustre of the product has never been achieved by the conventional methods. However, by utilizing the present invention, good mercerization becomes possible, and the conventional machine for such treating of cloth may be remarkably simplified, thus providing appreciable advantages.

Meanwhile cloths are woven with their threads maintained to certain degrees in a strained state, but the degrees of strain are not uniform. For this reason the cloth does not display its fully strength. That is to say, when a uniform tension is imposed on a cloth, having a certain length and width, in both lateral and longitudinal direction, the threads will break in a non-uniform manner, and eventually the cloth is divided. Now, when a uniform tension is imposed on a cloth in a woven state and the tension is increased to a point just short of the tension at which the threads will break, the strength of said cloth increases in a range of 30–50%. That is to say, all of the threads in every portion of the cloth are given a maximum tensile strength, and therefore the cloth is not easily broken or torn as compared with the conventional cloth.

Further, it has hitherto been thought that the less tension imposed on a cloth, the stronger the cloth will be. However, in such a case, some threads of the cloth are strained and others are loosened, which will cause wrinkles and the like. Therefore, in order to avoid the defects mentioned above, the cloth has hitherto been subjected to a treatment with resins, mercerization treatment, or a setting treatment and the like.

On the contrary, according to the present invention, the object thereof can be easily achieved by employing a combination of rollers, and further, the present invention is contemplated in such a manner that the strength of a cloth may be increased by employing a combination of rollers to expand the cloth and set (wet setting) it at the largest width of the cloth, instead of widening the cloth by employing a tenter and carrying out a setting.

The present invention is an apparatus capable of achieving the above-mentioned object and characteristics.

The object of the present invention is to provide a method of treating cloth, wherein the combination of a solid roller having grooves in its surface is urged into contact with a soft roller having a smooth surface and a cloth is passed between and in contact with the surfaces of each roller to increase the strength of the cloth.

The arrangement of the grooves on the solid roller is not particularly specified, but it is desirable for the grooves to be provided at close intervals.

In addition, the above-mentioned grooves may be arranged as longitudinal grooves provided in the circumferential direction of the roller, of oblique grooves at a certain angle to the circumferential direction of said roller or lateral grooves provided in the roller, but it is desirable to combine these different kinds of grooves in accordance with the object for use.

In conventional mercerizing apparatus, a clip tenter has generally been used to carry out the tentering of a cloth to be treated. But in practice, tentering of only about several centimeters of the cloth is effected, and in order to tenter the middle part of the cloth, the tentering treatment must be repeated about 2 or 3 times.

In addition, as the clip tenter is of a chain type, the transportation speed of the cloth cannot be sufficiently accelerated, and has hitherto been limited to the speed of about 100 to 150 m./min.

The present invention will be explained more fully with reference to the accompanying drawings, in which:

DESCRIPTION OF THE DRAWINGS

FIG. 1 is a front view of a combination of a pair of grooved rollers having square grooves, FIG. 2 is another front view of a combination of grooved rollers for expanding the width of cloth, and FIG. 3 is a side view of a combination of these rollers.

FIG. 4 to FIG. 7, inclusive, illustrate apparatus employed in embodiments of the present invention.

FIGS. 12–15 show examples of wet system tentering apparatus according to the present invention.

DESCRIPTION OF THE INVENTION

Figure 1:
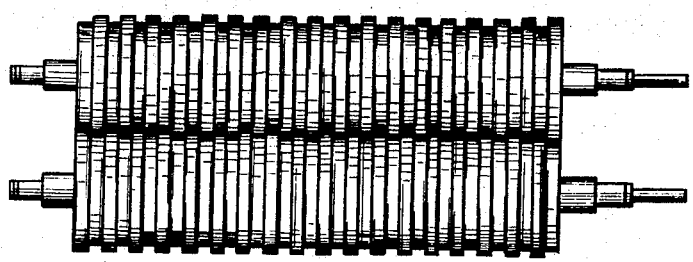
FIGS. 1–3 show an apparatus used in the practice of the processing and treating cloth according to the present invention.

FIG. 1 is a front view of a pair of grooved rollers having square grooves. These rollers are made of rubber having an appropriate hardness. In accordance with the qualities of the cloth to be treated, one of the rollers is covered with ebonite or is made of stainless steel. Further, appropriate clearances are given to the width of the grooves in consideration of the thickness of the cloth to be treated.

Further, the shape of these grooves, such as circular grooves, ladder shaped grooves and so forth is determined by the quality of the cloth. In addition, rollers combining various shapes of grooves may be used, in order to prevent the cloth from being damaged, for example, in case of square grooves, the portion of angles thereof are slightly rounded.

Figure 2:
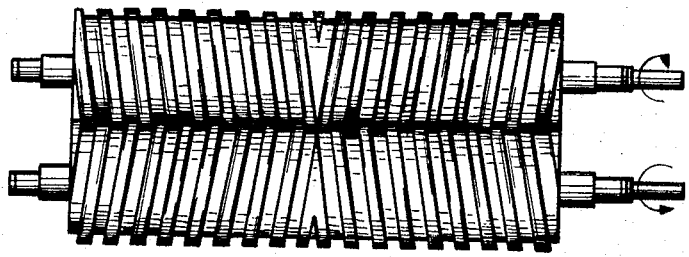

FIG. 2 is a front view of a combination of grooved rollers for expanding the width of cloth. The grooves of the rollers are formed as screwed or helical grooves extending from the centers of the rollers towards left and right ends thereof. These rollers are excellent not only for their ability to expand the width of cloth, but also for their ability to squeeze the cloth. These effects are obtained because where the cloth is pushed in the contact surface (nip) of the rollers it is always shifting, and the effects in washing by rubbing, and the like are remarkably increased.

Figure 3:
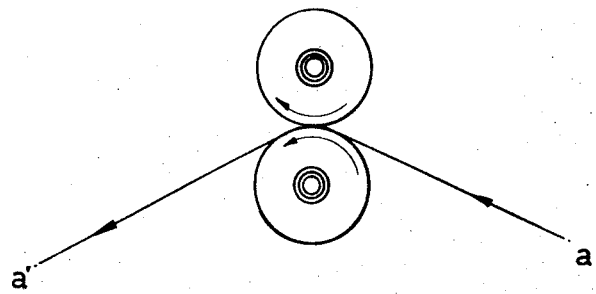

FIG. 3 is a side view of a combination of these rollers for expanding the width of cloth. When the cloth is made to pass, as shown from a to a', and the rollers are made to rotate in a direction shown by the curved arrows, the cloth will be pushed obliquely between the rollers with the aid of the projections of the grooved portions of the rollers for expanding the cloth towards both sides thereof.

Further, the rotation of these rollers is so contemplated that it may be regulated by employing a transmission and the like to widen and regulate the width of the cloth. This can be achieved in the manner as shown in FIGS. 2–3. That is to say, when the rotation speed of the rollers is slightly slowed down in transportation of the cloth, as shown in FIGS. 2–3, so that the peripheral velocity of the rollers will become slower than that of the transportation of the cloth, the cloth begins to be forcibly widened. On the contrary, when the rotation of the rollers is speeded up to make the peripheral velocity of the rollers greater than that of the transportation of the cloth, the extent to which the cloth is widened is reduced. Thus, the operation of widening the cloth to a certain width may be carried out in such a manner that the micro-regulation of the rotation speed of the rollers is effected automatically or by hand.

As mentioned above, the effects of the present invention are remarkable, for example, the increase of the treating ability, the simplification of the apparatus, the decrease in the installation area required for the apparatus, and the cost reduction owing to the decrease in the amount of the liquid agent to be used and so forth.

Next, the present method for treating cloth to increase its strength will be explained referring to FIGS. 4–11.

As shown in FIG. 4, a cloth 21 is conveyed in a mangle A, formed of a soft roller 22 made of rubber having a sufficiently large diameter and a smooth surface (Shore hardness: 55°±2°) and a grooved roller 23 made of hard rubber (Shore hardness: 98°±2°), and forms an irregular surface in the cloth between the surfaces of the rollers 22 and 23 contacted with each other by pressure, then the irregular surfaces are made flat by a curved expander roller 24, and the cloth is subjected to another expander 27 after passing over roller 25 located in a liquid tank 26 (containing water or other agents) and then proceeds towards a combination of grooved rollers forming a mangle B also consisting of a soft roller 22 and a grooved hard roller 23 contacted with each other by pressure. In this way, the cloth is passed continuously through mangles C, D to H.

Figure 8:
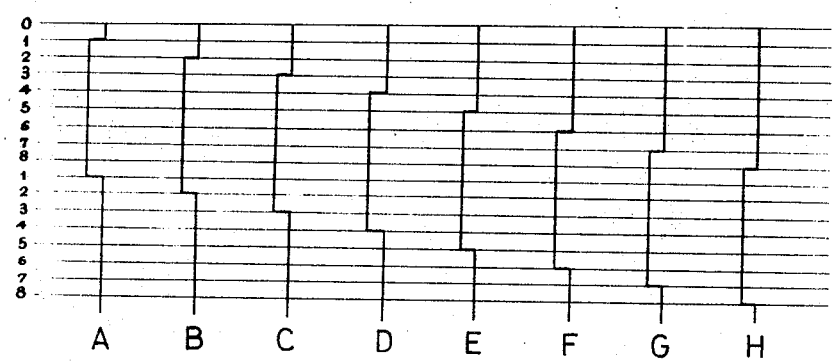
FIG. 8 shows the condition of shifting of the grooves on the rollers in FIG. 4 to FIG. 6, inclusive.

In the above case, as shown in FIG. 8, the grooves of the rollers change their phases in the order of mangles A, B, C and so on, shifting the phases gradually so that any irregularity may be dispersed into uniform intervals from the mangle A to the mangle H.

Figure 11:
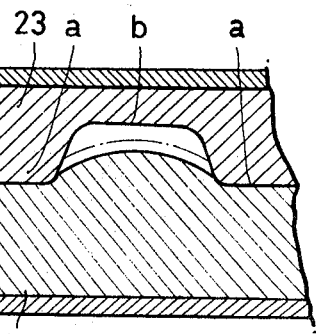
FIG. 10 and FIG. 11 are enlarged partial illustrations, showing the appearance of the grooved surface roller and flat surface roller under pressure.
Figure 10:
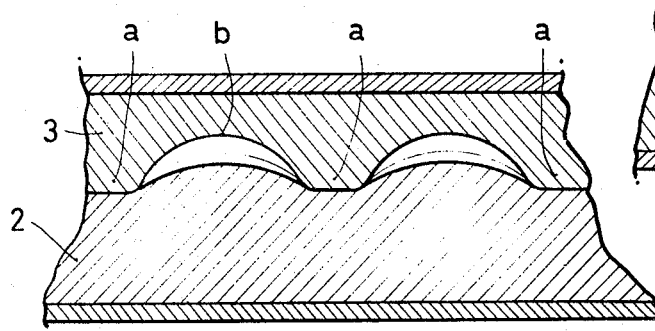

In the above case, the grooves of the hard rollers 23 cut into the soft roller in a sufficient degree to increase the strength of the cloth. This is illustrated in FIGS. 10 and 11, wherein a cloth on the roller 22 made of soft rubber is, in the first place, held down on the hard roller 23 at certain intervals by the grooved parts or lands a of the hard rubber rollers, and then the grooved parts a cut into the surfaces of the soft rubber rollers 22, so that the portion of the cloth, which is not held down by the grooved parts or lands a, may be projected, and the cloth may be elongated by a length of the projected part, that is, an arc portion. In this manner, the cloth is elongated in its lateral direction, and in the longitudinal direction of said cloth, a tension may be imposed in a simple fashion by giving a speed differential to the tension rollers between each of the mangles.

When a tenter is employed in a mercerization process and the like, the middle portion of the cloth is not tensioned at all. On the contrary, according to the present invention, each of the sections of the cloth is uniformly tensioned, so that the present invention also may function effectively in a mercerization treatment of a cloth.

Further, FIGS. 5 and 6 are practical modes of employing an apparatus according to the present invention, wherein a soft rubber roller 22 having a smooth surface and a sufficiently large diameter is set at the central part of the combination of rollers, and several hand grooved rollers 23 are positioned in spaced locations on the circumference of the roller 22 in order to give irregular surfaces to the cloth by depositing a spraying agent or water and the like to the cloth immediately before the cloth passes over the grooved rollers. The cloth also passes over expander rollers 28.

Figure 9A:
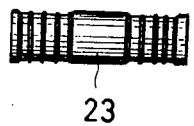
FIG. 9a and b show the variations of the grooves on the rollers in FIG. 4.
Figure 9B:
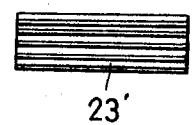

In addition, FIG. 7 shows a practical mode of the present invention similar to FIGS. 5 and 6, except that, as shown in FIGS. 9a and b, a roller 23 provide with grooves in its circumferential direction and a roller 23′ provided with grooves in its longitudinal direction are combined for use and arranged in order to impose a tension alternately in the longitudinal and lateral directions of the cloth.

The process of the present invention can be applied to various treatments of cloth. For example, it may be effectively employed for tentering cloth by washing with water in a continuous treatment with resins. Further, when the process of the present invention is employed instead of tenter in mercerization apparatus, satisfactory results can be obtained.

Following are the examples when the wet system tentering apparatus of the present invention is applied to a mercerization apparatus. But it should be noted that the apparatus of the present invention may be applied to all of the wet tentering processes carried out in a washing apparatus in a mercerization treatment.

EXAMPLE 1

In FIG. 12, which is illustrative of one example of apparatus embodying the present invention, the sections each indicated as 31, 31 . . . , are respectively independent units of the apparatus. Each of the units of the apparatus, indicated as 31, is constructed in such a manner that the hereinafter mentioned longitudinal tension rollers and lateral tension rollers are accommodated within a substantially closed alkali solution tank.

$C_1$, $C_1′$ and $C_2$, $C_2′$ are respectively longitudinal tension rollers forming upper and lower counter parts, said tension rollers having narrow grooves disposed in the peripheral direction on the surfaces of the rollers. In addition, the greater portion of each of the lower rollers $C_1$ $C_2$ is located below the level of the alkali solution 32 in the apparatus 31.

These longitudinal tension rollers are constructed in such a manner that a cloth suspended over the rollers such as $C_1$, $D_1$ and the like may be given a tension in a determined direction by pushing up the upper roller $C_1′$ in the direction indicated by the arrow. (Further, it is also possible to achieve the same result by pushing down on the lower rollers $C_1$ and $C_2$.)

$A_1$, $A_1′$ and $A_2$, $A_2′$ are respectively lateral tension rollers forming lower and upper counterpart, and there are placed between $C_1$ and $C_1′$ or between $C_2$ and $C_2′$ respectively and are contacted by each other by pressure. The rollers of each pair are in engagement with each other by means of their grooves and projections provided in the peripheral direction of the rollers.

$B_1$, $B_1′$ and $B_2$, $B_2′$ are respectively pairs of lower and upper rollers pressed against each other, these pairs of rollers being arranged alternately with the pairs of rollers $A_1$, $A_1′$ and $A_2$, $A_2′$. These are also lateral tension rollers and form a surface contacted by pressure. That is to say, the lower rollers $B_1$, $B_2$ are soft rollers having smooth surfaces and the upper rollers $B_1′$, $B_2′$ are hard rollers having grooves in the peripheral direction. $D_1$–$D_8$ are guide rollers.

The action of the above-mentioned unit mercurization apparatus is explained as follows: namely, A cloth 33 to be treated passes into the unit of apparatus 31 and enters into a tank of alkali solution 32 passing over a guide roller $D_1$ and is suspended over the roller $C_1$, and then comes out of the alkali solution and passes between the rollers $A_1$ and $A_1′$, through the guide roller $D_2$, and at last is suspended over the roller $C_1′$ after moving over the guide roller $D_3$.

In this case, the cloth is given a longitudinal tension by the rollers $C_1$, $C_1′$ and at the same time it is given a lateral tension by the rollers $A_1$ and $A_1′$, while the rollers $A_1$ and $A_1′$ functions also as squeezing rollers.

As mentioned above, the cloth passed over the roller $C_1′$ is again given a lateral tension while it passes between the rollers $B_1$ and $B_1′$ after traveling over the guide roller $D_4$, and as mentioned above, the cloth is given a longitudinal and lateral tension with the longitudinal tension rollers $A_2$, $A_2′$ and lateral tension rollers $B_2$, $B_2′$ respectively after being subjected to a mercurization treatment. In addition, the rollers $A_1$, $B_1$, $A_2$ and $B_2$ function as driving rollers.

Further, the grooves provided on the surfaces of the rollers belonging to the above-mentioned groups A, B and C may be rectangular, arc-like or otherwise but it is desirable that the grooves provided in the circumferential direction or slanted with an acute angle against the circumferential direction, be arranged at intervals as close as possible with each other.

EXAMPLE 2

In FIG. 13, which shows another embodiment of the present invention, 31 shows a unit of the apparatus which contains the hereinafter-mentioned longitudinal and lateral tension rollers and a separate tank containing an alkali solution. The tanks 34, 34′ contain an alkali solution, in which the rollers $C_1$ and $C_2$ are immersed.

In addition, each pair of rollers $C_1$ and $C_1′$, and $C_2$ and $C_2′$ constitutes respectively longitudinal tension rollers, and each of the pairs of rollers $A_1$ and $A_1′$, and $A_2$ and $A_2′$ constitutes lateral tensioning rollers. $D_1$–$D_8$ represent guide rollers, but $D_2$ and $D_3$, and $D_6$ and $D_7$ are dancer rollers. In this embodiment of the present invention, the group of upper and lower rollers C are fixed in place, and longitudinal tension of the cloth is regulated with the dancer rollers.

EXAMPLE 3

FIG. 15 shows an example of a high speed continuous mercerizing apparatus constructed by arranging 4 tanks of the unit apparatus 31 shown in FIG. 12 as a group of alkali treatment apparatus, next thereto two tanks of the same apparatus are employed as water washing means, then two more tanks of the same type are utilized as a group of setting apparatus, and finally ten of the same tanks are used as water washing apparatus, for a total of eighteen tanks.

Further, 35 shows a high pressure mangle, 36 is a saturator and 37 is a piler.

The effects of the present apparatus may be summarized and enumerated as follows; namely, (1) Though only up to 150 m./min. of treating speed could be obtained in tentering according to the usual tentering apparatus, because the apparatus was driven by chains, the process of the present invention is not influenced by the speed of the cloth, because it is of a roller type.

(2) According to the usual tentering methods, fissures in a cloth often occur if the opening degree of tentering is made to increase when the cloth is entering into a tenter apparatus at high speed, and the length of the tenter must be long. Therefore, the installation area of the tentering machine must be increased. On the contrary, in accordance with the present invention, the required area is considerably less.

(3) According to the usual clip tenters, the tentering of the cloth cannot be effected uniformly in every portion of said cloth, and therefore the center of the cloth is different from the other portions thereof.

On the contrary, according to the present invention, it is possible to effect a tentering with an equivalent strength in both the longitudinal and lateral directions, and therefore the cloth is uniform in every portion of said cloth.

(4) In a mercerization treatment according to the usual tentering method, it is necessary to provide an alkali solution shower on the tenter, and a suction beneath the tenter. But in the present invention, shower, suction and the like are not necessary as it is only required to arrange the rollers in a tank containing an alkali solution.

(5) According to the conventional methods, the elongations in both longitudinal and lateral directions have been combined in series. But in the present invention, the longitudinal and lateral elongations of the cloth may be done simultaneously by simply accommodating a group of rollers in a single box.

(6) According to the conventional tentering methods, it is necessary to change the width of the tenter every time the width of cloth to be treated changes. But the present invention may be carried out regardless of the width of the cloth.

(7) According to the present invention, a simultaneous tentering of a two ply cloth may be done, but this cannot be carried out in accordance with the usual tentering method.

What is claimed is:

1. A method of longitudinally and laterally tensioning cloth during a continuous wet treatment of the cloth comprising passing the cloth in its longitudinal direction through at least one wet treatment bath, applying tension to the cloth in the longitudinal direction between two spaced locations along its length, applying tension to the cloth in the lateral direction at a location situated between the two locations of the application of the longitudinal tensioning so that the cloth is stretched simultaneously in the longitudinal and lateral directions, and applying lateral tension to the cloth by rectilinearly yieldably supporting one surface of the cloth across its width and forcibly depressing the other surface of the cloth at a plurality of spaced positions across its width into the yieldable support so that the cloth is depressed inwardly into the yieldable support at a plurality of spaced positions and is tensioned laterally between the positions at which it is depressed for affecting a stretching action in the lateral direction with the cloth being supported on the yieldable support.

2. A method, as set forth in claim 1, comprising the step of continuously changing the locations in the lateral direction at which the cloth is gripped in the lateral tensioning operation.

References Cited

UNITED STATES PATENTS

| | | | |
|---|---|---|---|
| 71,647 | 12/1867 | Roche | 26—63 |
| 1,347,714 | 7/1920 | Rowley | 26—51X |
| 2,364,157 | 12/1944 | Mellor et al. | 26—51 |

FOREIGN PATENTS

| | | | |
|---|---|---|---|
| 30,067 | 1/1885 | Germany | 26—63 |
| 282,446 | 3/1915 | Germany | 26—63 |
| 424 | 1866 | Great Britain | 26—63 |
| 1,239 | 1865 | Great Britain | 26—63 |
| 8,230 | 1900 | Great Britain | 26—63 |
| 5,621 | 1886 | Great Britain | 26—63 |

ROBERT R. MACKEY, Primary Examiner

U.S. Cl. X.R.

26—54, 63